Feb. 2, 1965 T. M. KOCHAVER 3,168,103
PIPE LINE VENT
Filed June 22, 1962 2 Sheets-Sheet 1
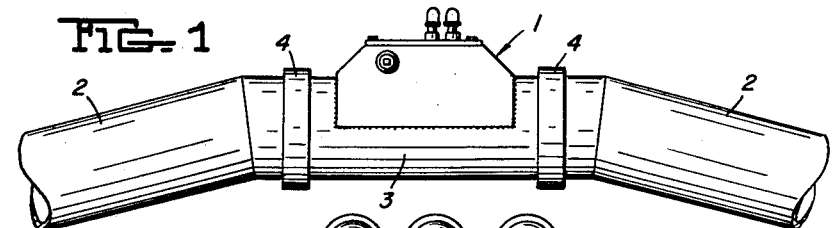
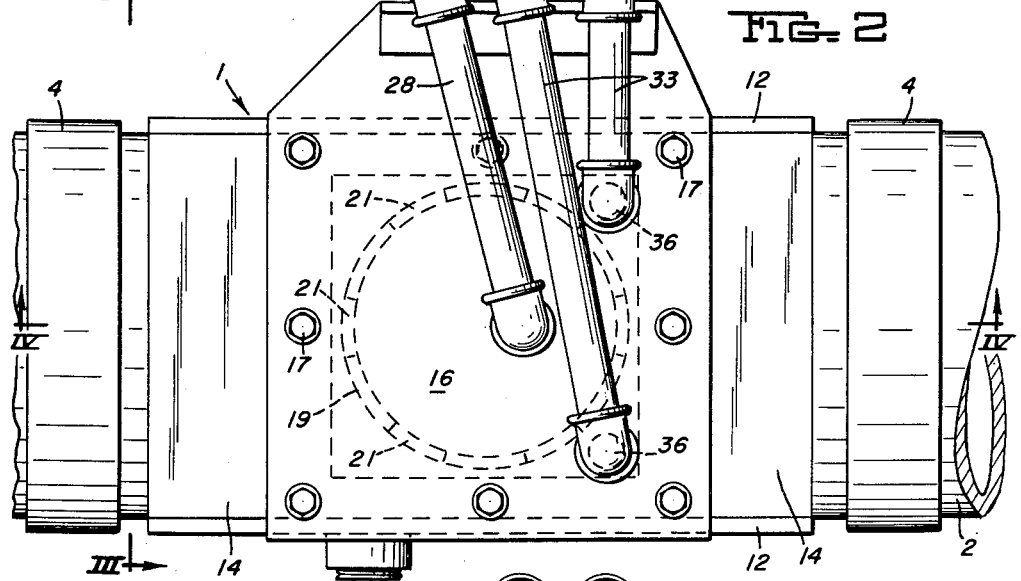
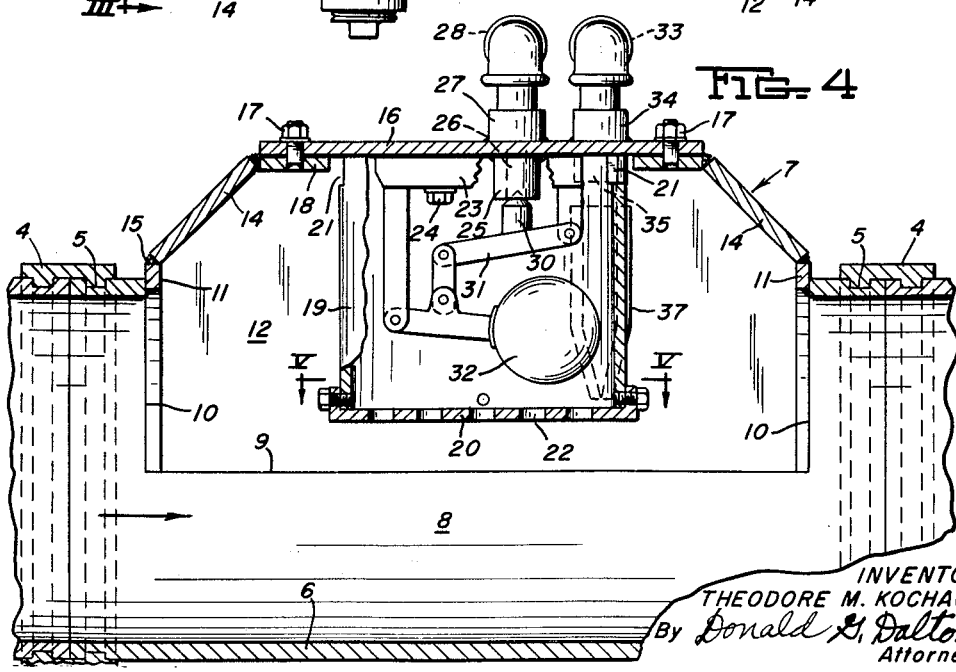
INVENTOR
THEODORE M. KOCHAVER
By Donald G. Dalton
Attorney Feb. 2, 1965 T. M. KOCHAVER 3,168,103
PIPE LINE VENT
Filed June 22, 1962 2 Sheets-Sheet 2
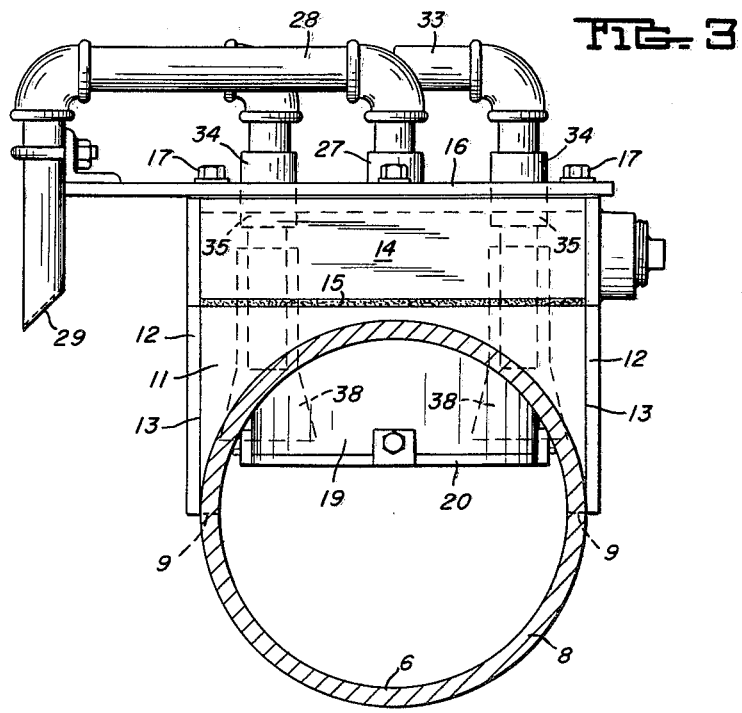
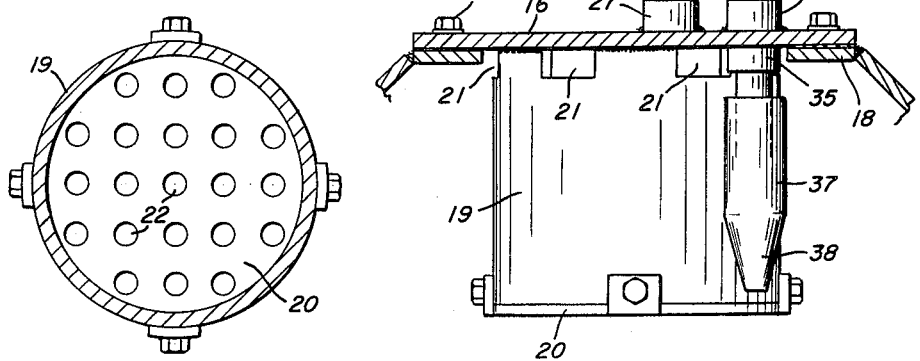
INVENTOR
THEODORE M. KOCHAVER
By Donald G. Dalton
Attorney

United States Patent Office 3,168,103
Patented Feb. 2, 1965

3,168,103
PIPE LINE VENT
Theodore M. Kochaver, Duluth, Minn., assignor to United
States Steel Corporation, a corporation of New Jersey
Filed June 22, 1962, Ser. No. 204,457
9 Claims. (Cl. 137—202)

This invention relates to vents for pipe lines that are used in the transportation of fluid materials and, more particularly, to improvements for preventing freezing of vents in cold weather.

When pipe lines for transporting liquid materials are emptied or filled, high points therein must be vented to the atmosphere. Unless this is done air or vacuum locks form and prevent completion of the filling or emptying operation. If the line is being filled, accumulations of air or gas at high points will prevent filling of the line unless it is released to the atmosphere. Similarly, a vacuum lock will form at each high point in the line when it is being emptied that will interfere with the emptying operation unless atmospheric air is admitted into the line at the point of the vacuum lock. While vents for preventing air and vacuum locks of this character have been proposed, conventional forms thereof act as traps in which liquid collects when venting operation of the valve is not required, and if the trapped liquid freezes the vent cannot operate. The problem of freezing is particularly troublesome when the line is used for transporting water or material containing water such as tailings in mining operations.

One of the principal objects of this invention is to provide a pipe line vent that will not freeze in cold weather. A further and related object is to provide a vent for pipe lines in which the fluid moving through the line has its flow directed over the valve mechanism therein to protect it from freezing. These and other objects are accomplished by providing a vent housing that is connected in and forms part of the pipe line, and is larger than the pipe line by an amount corresponding to the space taken up by the valve mechanism therein so that the flow of liquid through the housing is not restricted, but travels continuously over and around all interior surfaces of the housing and the valve mechanism therein.

Other objects and advantages of the invention will become apparent from the following description.

In the drawings there is shown a preferred embodiment of the invention. In this showing:

FIGURE 1 is a fragmentary side elevational view of a pipe line which is provided with the vent of this invention at one of the high points therein;

FIGURE 2 is a plan view on an enlarged scale of the vent shown in FIGURE 1;

FIGURE 3 is a view looking in the direction of the line III—III of FIGURE 2;

FIGURE 4 is a sectional view taken substantially along the line IV—IV of FIGURE 2;

FIGURE 5 is a sectional view taken substantially along the line V—V of FIGURE 4; and FIGURE 6 is a fragmentary elevational view of the cylindrical baffle for the valve mechanism in the vent shown in FIGURES 2–4.

FIGURE 1 shows the location of the vent 1 of this invention at a high point in a line formed of pipe 2 for transporting liquids or fluid materials. The vent 1 comprises a housing 3 that has connections in the form of couplings 4 at opposite ends thereof with the pipe 2 so that it forms part of the fluid transmission line. The housing 3 may be one of the pipes 2 that is cut and fabricated in a manner to be described, but is preferably a specially formed unit as shown in FIGURES 2–4 that is provided with grooves 5 at its ends for connection by the couplings 4.

As shown in FIGURES 2–4, the housing 3 comprises a semi-cylindrical bottom portion 6 and an upper portion 7 that is fabricated on the lower portion 6 in a manner to be described. The housing 3 is formed from a section 8 of pipe that has the same diameter as the line pipe 2 so that the lower portion 6 forms a smooth continuation of the pipe 2 with which it is connected. A central upper part of the section 8 is removed by cutting along horizontal lines 9 at opposite sides thereof and along axially spaced semi-circular lines 10 to provide for the assembly thereon of the upper portion 7 of the housing 3. The upper housing portion 7 is formed by welding end pieces 11, which have semi-circular lower edges as shown in FIGURE 3, in position along the pipe edges 10, and by welding vertical side plates 12 along the horizontal edges 9 of the bottom portion 6 and the vertical side edges 13 of the end pieces 11. The top of the housing 7 is formed by end plates 14 that are arranged in angularly converging positions and have welded connections at their ends to the side plates 12 and welded connections along their bottom edges to the upper edges 15 of the end plates 11. A cover plate 16 is fastened by bolts 17 to a frame 18 that has a central opening of rectangular shape and is welded about its outer periphery with the upper edges of the housing plates 12 and 14. A cylindrical baffle 19 is secured by welding to the cover plate 16 and has a cover plate 20 fastened to its lower end. Slots 21 at circumferentially spaced intervals about the upper end of the cylinder 19 and openings 22 uniformly distributed over the area of the cover plate 20 provide for circulation of fluid through the interior of the cylinder 19. The slots 21 at the top of the cylinder 19 provide for the flow of liquid therethrough so that freezing will not take place therein. The openings 22 in the bottom plate 20 are provided so that solids in the liquid being transported will not settle out and collect thereon.

The cylinder 19 forms a baffled enclosure for the valve mechanism that controls the exhaust of air or gas from the interior of the housing 3 and the pipe line. The valve mechanism for releasing gas and air to the atmosphere comprises a frame 23 that is fastened by bolts 24 to the cover plate 16 and has a valve port 25 therethrough which is connected through an opening 26 in the cover plate 16 with a coupling 27. Piping 28 connects the coupling 27 to the atmosphere through a suitable opening at the outer end 29 thereof. A valve 30 is mounted on a pivoted lever 31 for movement to and from a position in seating engagement with the valve port 25 in which it closes the connection of the housing 3 with the atmosphere through the pipe 28. A float 32 controls the pivotal movement of the lever 31 and thereby movement of the valve 30 to and from its closed position in seating engagement with the valve port 25. The specific construction of the valve mechanism thus far described including the pivoted linkage for its actuation by the float 32 is conventional and forms no part per se of this invention. For the purposes of this invention, it will be sufficient to indicate that the float 32 moves downwardly to a position resting on the plate 20 when pipe line is empty or is being filled, and in this position the valve 30 is disengaged from the port 25 to provide a connection between the interior of the housing 3 and the atmosphere to release air or gas therefrom while the pipe line is being filled. When the pipe line is filled, the float 32 moves to the position shown in FIGURE 4 in which the valve 30 has seating engagement with the port 25 and operates to disconnect connection of the interior of the housing 3 with the atmosphere through the pipe 28. The baffling action of the cylinder 19 protects the float 32 and parts operated thereby from the turbulence of the liquid flowing through the line.

Atmospheric connections for releasing vacuum locks in the pipe line are provided by a pair of pipes 33 similar to the pipe 28 that are connected with the interior of the housing 3 by couplings 34 and 35 about openings 36 in the cover plate 16. Vacuum release or breaker valves 37 are connected to the lower couplings 35. The vacuum breaker valves 37 are conventional and respectively comprise a length of rubber hose that is flattened at its lower end 38 and is connected at its upper end with one of the couplings 35 by a hose clamp (not shown). Under above atmospheric pressures the flattened lower ends 38 of the valves 37 are closed and operate to disconnect the interior of the housing 3 from the atmosphere. When a vacuum is created in the interior of the housing 3, the lower ends 38 of the valves 37 open to admit air thereto and close when the pressure within the housing equals that of the atmosphere. Although air is admitted by the lever operated valve 30 when the line is being emptied, the amount that can enter through the port 25 is limited and will restrict the rate at which fluid is drained from the line. The breaker valves 37 are provided so that additional air will be admitted to the line and thus increase the rate at which it can be emptied. The vacuum breaker valves 37 are preferably located on the downstream side of the cylinder 19 which thus acts as a baffle for the valves 37.

From the foregoing, it will be apparent that the specific construction of the housing 3 and its upper portion 7 in particular provides for the location of the valve mechanism of the vent 1 in the flow of the liquid being transported through the line. It should also be noted that the specific construction of the housing 3 increases its cross-sectional area compared to that of the pipe 2 by an amount not substantially greater than the cross-sectional area occupied by the cylinder 19 and valve mechanism therein. In this manner the flow of liquid being transported through the line is not restricted as it moves through the housing 3 and is maintained at the same velocity as that of the flow in the pipe 2. There are thus no dead spaces or traps in the housing 3 in which liquid will collect and freeze when sub-freezing temperatures are encountered.

Although the vent of this invention is preferably prefabricated as a unit for connection in a line by couplings 4, it can as indicated above be built in place on one of the pipes 2 in a line and would thus be a projection on an otherwise continuous pipe surface. Attention is further directed to the fact that the bolted connection of the cover 16 on the housing upper portion 7 provides for removal of the complete valve assembly for inspection, repair, maintenance, etc.

While one embodiment of my invention has been shown and described it will be apparent that other adaptations and modifications may be made without departing from the scope of the following claims.

I claim:

1. An atmospheric vent for preventing air and vacuum locks at an intermediate point of high elevation in a pipe line for transporting fluids comprising a valve mechanism for venting said pipe line to the atmosphere, a housing for said valve mechanism connected in and forming a part of said line at said high point, and means mounting said valve mechanism in said housing, the cross-sectional area of said housing being larger than the cross-sectional area of said pipe by an amount not substantially greater than the cross-sectional area occupied by said valve mechanism so that fluid travelling through said line flows through all parts of the interior of said housing to prevent its freezing when said housing is subject to sub-freezing temperatures.

2. A vent for fluid transmission pipe lines comprising a housing having connections at opposite ends thereof with the pipe in said line, said housing comprising a semi-cylindrical bottom portion extending between said ends and an upper portion formed by sidewalls joined with the upper edges of said bottom portion and a top cover plate, a valve mechanism suspended from said cover plate for venting the interior of said housing and thereby said pipe line to the atmosphere to prevent the formation of vacuum and air locks therein, the cross-sectional area of said housing upper portion being larger than the cross-sectional area of its said bottom portion by an amount not substantially greater than the cross-sectional area occupied by said valve mechanism so that fluid travelling through said line flows through all parts of the interior of said housing to prevent freezing of the fluid therein when said housing is subject to sub-freezing temperatures, said valve mechanism including means for venting the interior of said housing and thereby said pipe line to the atmosphere to prevent the formation of air and vacuum locks therein.

3. A pipe line vent as defined in claim 2 characterized by the provision of a cylindrical baffle secured to and depending from said cover plate, and by said valve mechanism being arranged in the interior of said baffle.

4. A pipe line vent as defined in claim 3 characterized by said baffle having openings adjacent said cover plate providing for the flow of fluid therethrough.

5. A pipe line vent as defined in claim 4 characterized by said baffle having a cover plate on the lower end thereof, said cover plate having openings therein for the circulation of fluid through the interior of said baffle.

6. A pipe line vent as defined in claim 5 characterized by said valve mechanism comprising a float operated valve that operates to connect said housing to the atmosphere when the level of fluid therein falls to a predetermined level.

7. A pipe line vent as defined in claim 2 characterized by said valve mechanism including vacuum breaker valves supported in positions depending from said cover plate.

8. A pipe line vent as defined in claim 7 characterized by said breaker valves being located on the downstream side of said cylindrical baffle.

9. In a fluid transmission pipe line having an intermediate point of high elevation therein, the combination therewith of an atmospheric vent for preventing air and vacuum locks in said pipe line comprising a housing forming a part of said line, said housing having connections at opposite ends in said line at said high point, valve mechanism in said housing for venting the interior thereof to the atmosphere to prevent air and vacuum locks therein, the cross-sectional area of said housing being larger than the cross-sectional area of said pipe by an amount not substantially greater than the cross-sectional area occupied by said valve mechanism therein so that fluid travelling through said line flows through all parts of the interior of said housing to prevent its freezing when said housing is subject to sub-freezing temperatures.

References Cited in the file of this patent

UNITED STATES PATENTS

| 1,425,940 | Boyd | Aug. 15, 1922 |
| 1,825,776 | Brubaker | Oct. 6, 1931 |
| 2,935,990 | Biddle | May 10, 1960 |

FOREIGN PATENTS

| 940,225 | Germany | Mar. 15, 1956 |